US008687112B2

(12) United States Patent
Hsin et al.

(10) Patent No.: US 8,687,112 B2
(45) Date of Patent: Apr. 1, 2014

(54) ADJUSTMENT DEVICE AND METHOD THEREOF

(75) Inventors: Ming-Tsung Hsin, Taipei (TW); Ching-Chung Wang, New Taipei (TW)

(73) Assignee: Altek Corporation, Hsinchu (TW)

( * ) Notice: Subject to any disclaimer, the term of this patent is extended or adjusted under 35 U.S.C. 154(b) by 100 days.

(21) Appl. No.: 13/568,904

(22) Filed: Aug. 7, 2012

(65) Prior Publication Data
US 2014/0009674 A1   Jan. 9, 2014

(30) Foreign Application Priority Data
Jul. 6, 2012   (TW) ............................. 101124489 A

(51) Int. Cl.
*H04N 5/225*   (2006.01)
*G03B 17/00*   (2006.01)
*G03B 17/02*   (2006.01)

(52) U.S. Cl.
USPC ............... 348/374; 348/373; 396/55; 396/72; 396/439; 396/535

(58) Field of Classification Search
USPC ............... 348/207.99, 208.99, 208.4–208.11, 348/373–376; 396/52–55, 72–88, 439, 535
See application file for complete search history.

(56) References Cited

U.S. PATENT DOCUMENTS

| | | | | |
|---|---|---|---|---|
| 4,803,557 A | * | 2/1989 | Bridges | 348/374 |
| 5,614,974 A | * | 3/1997 | Soshi et al. | 396/55 |
| 6,351,288 B1 | * | 2/2002 | Johnson et al. | 348/373 |
| 6,366,323 B1 | * | 4/2002 | Shono | 348/340 |
| 6,665,016 B2 | * | 12/2003 | Saitoh | 348/374 |
| 6,978,089 B2 | * | 12/2005 | Nomura et al. | 396/75 |
| 7,352,404 B2 | * | 4/2008 | Kurosawa | 348/357 |
| 7,532,247 B2 | * | 5/2009 | Kamoda et al. | 348/373 |
| 7,546,028 B2 | * | 6/2009 | Nomura et al. | 396/55 |
| 7,630,618 B2 | * | 12/2009 | Nomura | 396/55 |
| 7,961,223 B2 | * | 6/2011 | Okamoto et al. | 348/208.7 |
| 7,986,476 B2 | * | 7/2011 | Wang | 359/823 |
| 2003/0067544 A1 | * | 4/2003 | Wada | 348/208.7 |
| 2003/0156832 A1 | * | 8/2003 | Nomura et al. | 396/72 |
| 2005/0052570 A1 | * | 3/2005 | Enomoto | 348/375 |
| 2006/0007320 A1 | * | 1/2006 | Seo | 348/219.1 |
| 2006/0092285 A1 | * | 5/2006 | Shin | 348/208.7 |
| 2006/0115252 A1 | * | 6/2006 | Nomura | 396/55 |
| 2006/0115256 A1 | * | 6/2006 | Nomura | 396/55 |
| 2006/0115257 A1 | * | 6/2006 | Nomura | 396/55 |
| 2006/0115258 A1 | * | 6/2006 | Nomura | 396/55 |
| 2007/0086766 A1 | * | 4/2007 | Nomura et al. | 396/89 |
| 2007/0182824 A1 | * | 8/2007 | Nomura et al. | 348/208.99 |
| 2007/0182825 A1 | * | 8/2007 | Nomura et al. | 348/208.99 |
| 2010/0157074 A1 | * | 6/2010 | Kawai et al. | 348/208.7 |

* cited by examiner

*Primary Examiner* — Michael Osinski
(74) *Attorney, Agent, or Firm* — Muncy, Geissler, Olds & Lowe, P.C.

(57) ABSTRACT

The present invention discloses an adjustment device and method thereof which are applied for adjusting a photosensitive element. The adjustment device comprises a first platform, a second platform, a third platform and a cover. The first platform comprises a curved surface body and a positioning elastic element. The second platform, having a recess corresponding to each curved surface body and having a loading support portion, is arranged on a side of the first platform. The third platform is arranged on the other side of the first platform, and when the third platform, moves in an axial direction, the first and second platform moves together with the third platform. The cover compresses the photosensitive element against the second platform. When the inclination of photosensitive element is adjusted by the adjustment device, each curve surface body and each recess keep in contact due to the expansion of each positioning elastic element.

20 Claims, 8 Drawing Sheets

ADJUSTMENT DEVICE AND METHOD THEREOF

CROSS-REFERENCE TO RELATED APPLICATION

This application claims the benefit of Taiwan Patent Application No. 101124489, filed on Jul. 6, 2012, in the Taiwan Intellectual Property Office, the disclosure of which is incorporated herein in its entirety by reference.

BACKGROUND OF THE INVENTION

1. Field of the Invention

The present invention relates to an adjustment device, in particular to the adjustment device that combines a plurality of moving platforms with a plurality of positioning modules to adjust the angle of inclination of a focal plane of a photosensitive element and the distance between the photosensitive element and a camera lens.

2. Description of the Related Art

As optical technology advances, and major camera manufacturers promotes the market of cameras strongly in recent years, people nowadays generally record bits of their daily life by the cameras instead of writing diary. To meet the huge consumer market requirements, it is a main subject for related major manufacturers to lower the product cost and simplify the production procedure of the cameras.

Before cameras are shipped out from factories, several calibration or adjustment processes must be performed, and one of the important operations is to adjust photosensitive element with the optical axis of a camera device. The photosensitive element must be installed on the optical axis of the camera device, and the light sensing surface of the photosensitive element must be superimposed with the focal plane of the camera device, so that the camera device can produce clear images. If the light sensing surface of the photosensitive element is not superimposed with the focal plane of the camera device, then off-focusing or failure of focusing may occur when users use the camera device.

Most present existing adjustment devices of the photosensitive element adopt an adjustment module to push the disposition platform of the photosensitive element, so that the photosensitive element parallels with an optical axis. However, the adjustment module may rotate photosensitive element during the adjustment process, and the rotation will cause the adjustment cannot be performed precisely. Therefore, designing an adjustment device capable of adjusting the relation between the photosensitive element and the optical axis to overcome the rotating problem occurred during the adjustment process demands immediate attention and feasible solutions. In view of the aforementioned problems, the inventor of the present invention designed and developed an adjustment device to overcome the drawbacks of the prior art and improve the industrial application.

SUMMARY OF THE INVENTION

In view of the aforementioned problems of the prior art, it is a primary objective of the present invention to provide an adjustment device capable of overcoming the problem of failing to prevent the photosensitive element from being rotated during the adjustment process.

To achieve the aforementioned objective, the present invention provides an adjustment device, comprising: a first platform, a second platform, a third platform and a cover. The first platform has at least three cavities, and each of the cavities has a positioning module, and each of the positioning modules has a curved surface body and a positioning elastic element. The second platform is arranged on a side of the first platform and has a recess corresponding to each of the curved surface bodies, and a loading support portion outwardly extended from the second platform. The third platform is disposed on the other side of the first platform and electrically coupled to a control module, and the control module is provided for controlling the third platform to move in an axial direction, and making the first platform and the second platform move together with the third platform at the same time. The cover is disposed on a side of the second platform for pressing the photosensitive element to attach closely on the second platform. Wherein, when the loading support portion of the second platform is pushed by an external force, the second platform moves in the axial direction to adjust an inclination angle of the photosensitive element, and each of the positioning elastic elements is stretched to keep each of the curved surface bodies in contact with each of the recesses.

Preferably, the adjustment device further comprises an adjusting portion having at least three working claws for pushing the loading support portion respectively to move the second platform in an axial direction.

Preferably, a plurality of restoring elastic elements is disposed between the first platform and the second platform. When the second platform moves in an axial direction, the restoring elastic elements are provided for moving the first platform in an axial direction together with the second platform.

Preferably, the second platform further includes a plurality of adhesion units provided for attaching the photosensitive element onto the second platform closely.

Preferably, the cover includes a plurality of pins conforming to a shape of the photosensitive element for uniformly pressing the photosensitive element to attach the photosensitive element onto the second platform closely.

Preferably, the gap between adjacent pins falls within a range from three centimeters and a length or width value of the photosensitive element.

Preferably, the photosensitive element is disposed on a disposition surface of the second platform and the disposition surface is parallel to a load support surface of the loading support portion.

Preferably, the adjustment device further includes a sensing module for sensing a displacement of the second platform in an axial direction to generate a displacement signal, and the control module controls the third platform to move in an opposite direction along the axial direction according to the displacement signal, so as to move the first platform and the second platform in the opposite direction along the axial direction.

Preferably, when the adjustment device is situated in an initial adjustment state, the second platform is attached onto a side of the first platform closely.

Preferably, when the inclination angle of the photosensitive element is adjusted, the positioning module is provided for preventing the second platform to be rotated axially.

To achieve the aforementioned objective, the present invention further provides an adjustment method for a photosensitive element, and the method comprises: providing a first platform having at least three cavities; arranging a positioning module in each of the cavities, wherein each of the positioning modules has a curved surface body and a positioning elastic element; arranging a second platform on a side of the first platform, wherein a recess is formed at a position corresponding to each of the curved surface bodies, and a loading support portion extended outwardly from the first platform; arranging a third platform on the other side of the first platform and electrically coupled to a control module, wherein the control module controls the third platform to move in an axial direction, and driving the first platform and the second platform to move together with the third platform at the same time; disposing a cover onto a side of the second platform to press against the photosensitive element, so as to attach onto the second platform closely. When the loading support portion is pushed, the second platform moves in an axial direction, and each of the positioning elastic elements is stretched to keep each of the curved surface bodies in contact with each of the recesses.

Preferably, the adjustment method further comprises the following step: An adjusting portion having at least three working claws pushes the loading support portion respectively to move the second platform in an axial direction.

Preferably, the adjustment method further comprises the following step: dispose a plurality of restoring elastic elements between the first platform and the second platform; when the second platform moves in an axial direction, the restoring elastic elements are provided for moving the first platform together with the second platform in an axial direction.

Preferably, the adjustment method further comprises the following steps: dispose a plurality of adhesion units at the second platform, and the adhesion units are provided to attach the photosensitive element onto the second platform closely.

Preferably, the cover has a plurality of pins conforming to a shape of the photosensitive element for uniformly pressing against the photosensitive element to attach the photosensitive element onto the second platform closely.

Preferably, a gap between adjacent pins falls within a range from three centimeters and a length or width value of the photosensitive element.

Preferably, the photosensitive element is disposed on a disposition surface of the second platform and the disposition surface is parallel to a load support surface of the loading support portion.

Preferably, the adjustment method further comprises the following steps: providing a sensing module to sense a displacement of the second platform in an axial direction to generate a displacement signal; and using the control module according to the displacement signal to control the third platform to move in an opposite direction along the axial direction so as to move the first platform and the second platform in an opposite direction along the axial direction.

Preferably, the second platform is attached onto a side of the first platform closely when the adjustment device is situated in an initial adjustment state.

Preferably, the positioning module prevents the second platform from having a rotation in the axial axis, when the inclination angle of the photosensitive element is adjusted.

In summation, the adjustment device and method according to the present invention have one or more of the following advantages:

(1) The adjustment device and method of the invention uses at least three positioning modules, so that during the process of adjustment, the photosensitive element merely performs the axial displacement and does not have any rotation, so as to achieve the effect of making the adjustment more precisely.

(2) The adjustment device and method of the invention uses a control module and a positioning module to adjust the inclination angle and distance of the focal plane of the photosensitive element simultaneously, so as to achieve the effect of improving the efficiency of the adjustment device.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention.

Figure 1:
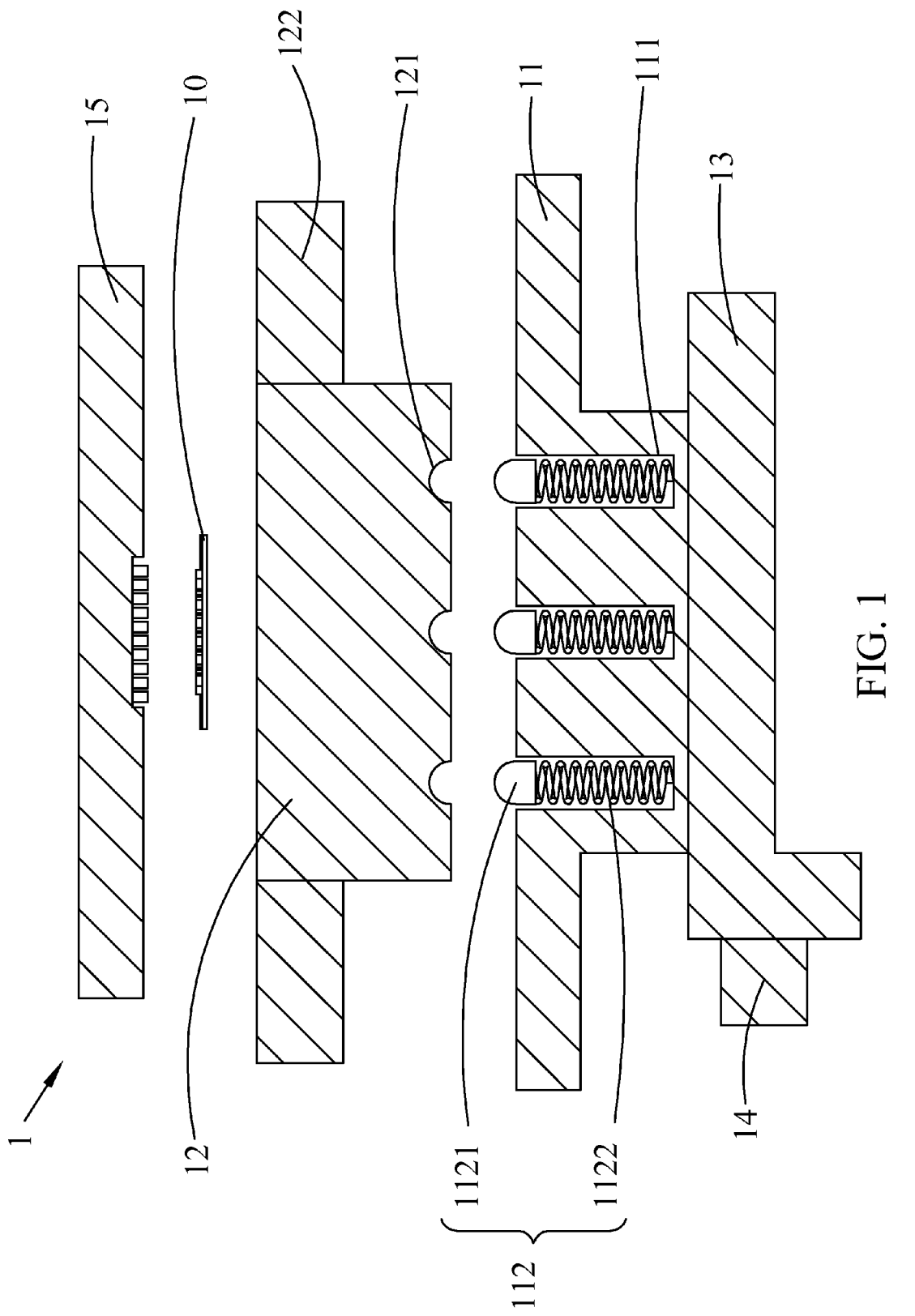
FIG. 1 is a first schematic view of an adjustment device of the present invention.
Figure 2:
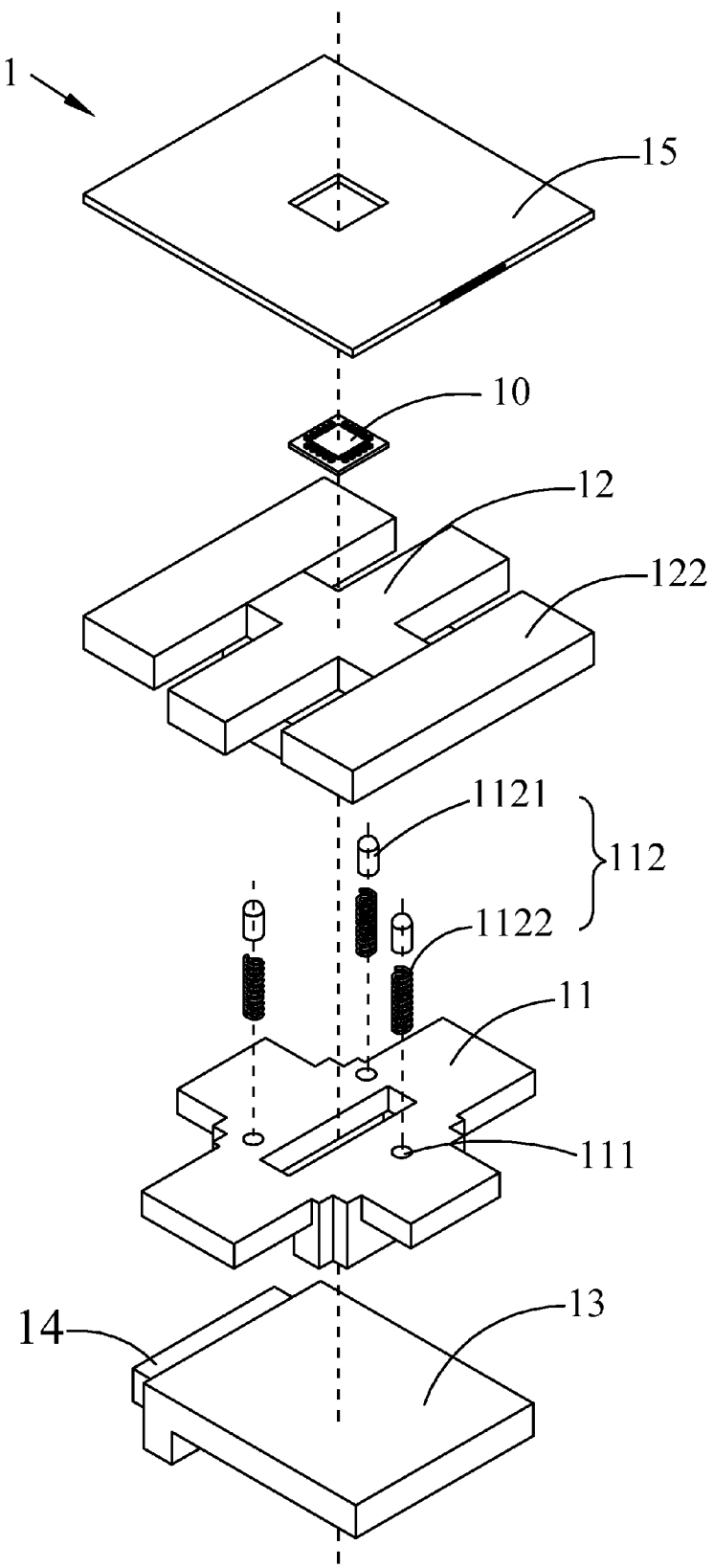
FIG. 2 is a second schematic view of an adjustment device of the present invention.

With reference to FIGS. 1 and 2 for the first and second schematic views of an adjustment device of the present invention respectively, the adjustment device 1 comprises: a first platform 11, a second platform 12, a third platform 13, a control module 14 and a cover 15. The first platform 11 has at least three cavities 111, and each cavity 111 has a positioning module 112, and each positioning module 112 has a curved surface body 1121 and a positioning elastic element 1122. Wherein, the positioning module 112 is a ball bearing connected to a spring. The second platform 12 is arranged on a side of the first platform 11, and each curved surface body 1121 has a recess 121, and a loading support portion 122 is extended outwardly from the second platform 12. The third platform 13 is arranged on the other side of the first platform 11 and electrically coupled to a control module 14, and the control module 14 controls the third platform 13 to move in an axial direction and drives the first platform 11 and the second platform 12 to move together with the third platform 13 simultaneously. The cover 15 is installed on a side of the second platform 12 to press the photosensitive element 10 to be attached onto the second platform 12 closely. When the loading support portion 122 is pushed, the second platform 12 is moved in an axial direction, and the expansion of each positioning elastic element 1122 maintains each curved surface body 1121 in contact with each recess 121.

In other words, the photosensitive element 10 is disposed on the second platform 12, such that if it is necessary to adjust the inclination angle of a focal plane of the photosensitive element 10, the loading support portion 122 of the second platform 12 is pushed to adjust the photosensitive element 10 to a required position. In the adjustment process, the second platform 12 moves away from the first platform 11 gradually, and the expansion of each positioning elastic element 1122 of the positioning module 112 maintains each curved surface body 1121 in contact with the recess 121 of the second platform 12 all the time, so that the second platform 12 will not have any horizontal rotation during its movement in the axial direction.

Figure 3:
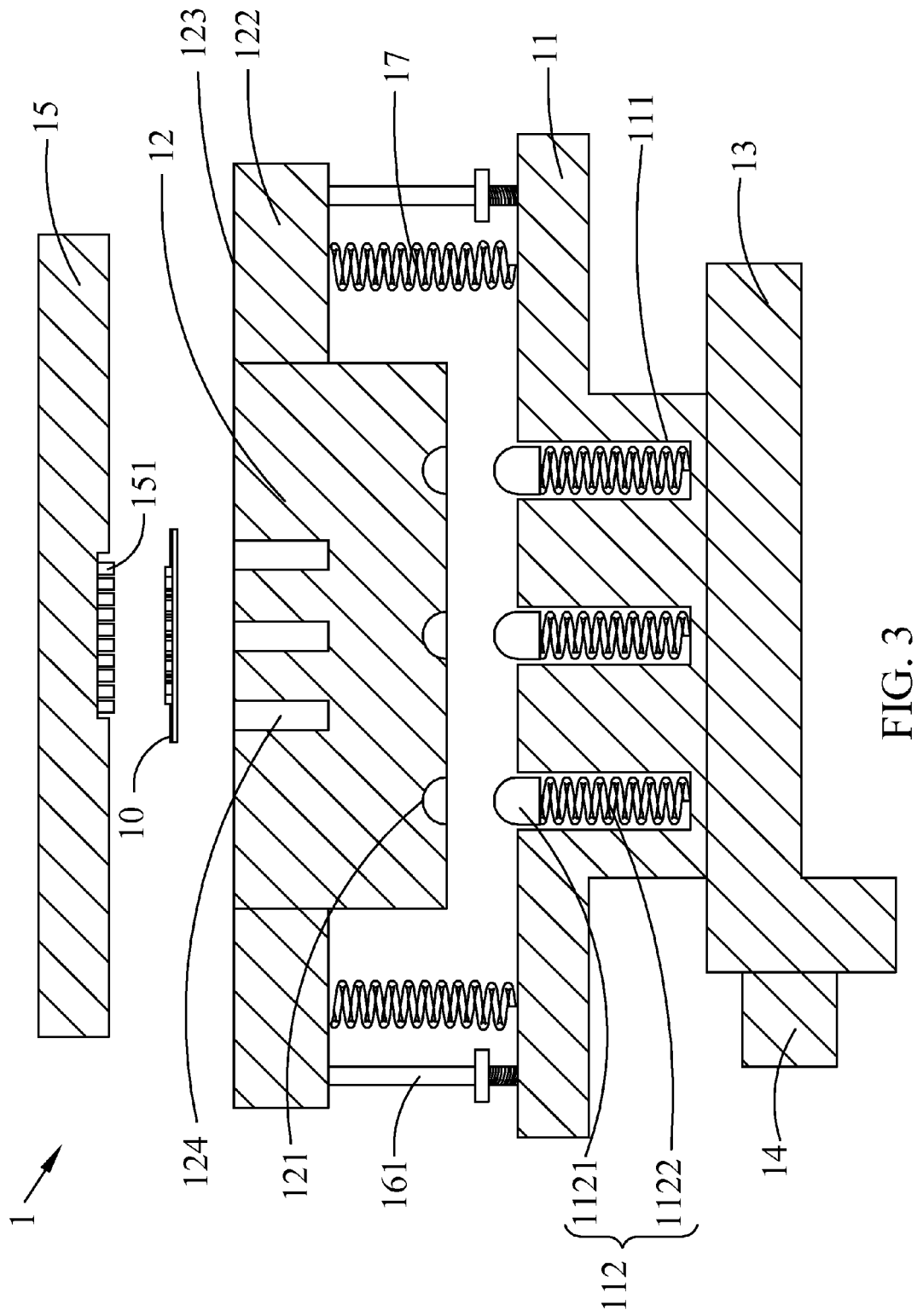
FIG. 3 is a first schematic view of an adjustment device in accordance with a first embodiment of the present invention.
Figure 4:
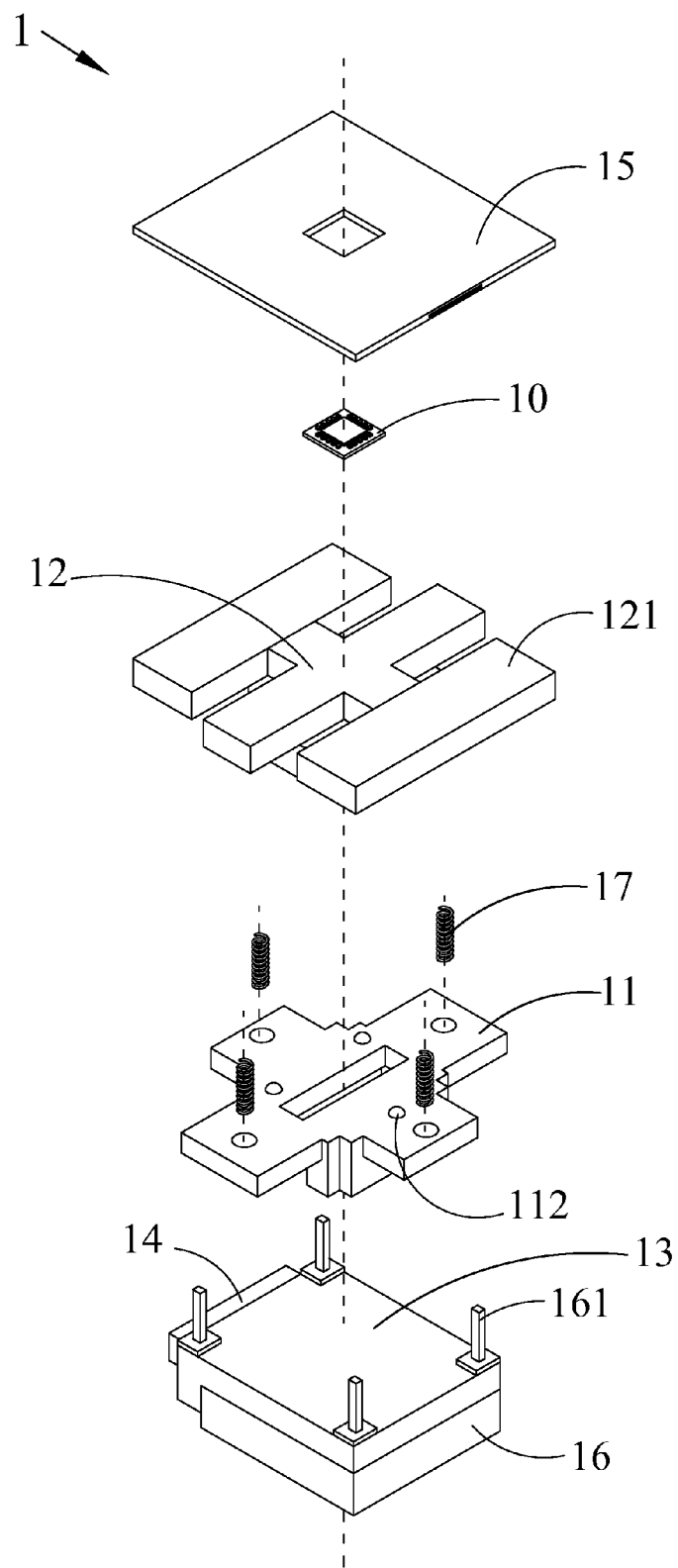
FIG. 4 is a second schematic view of an adjustment device in accordance with the first embodiment of the present invention.
Figure 5:
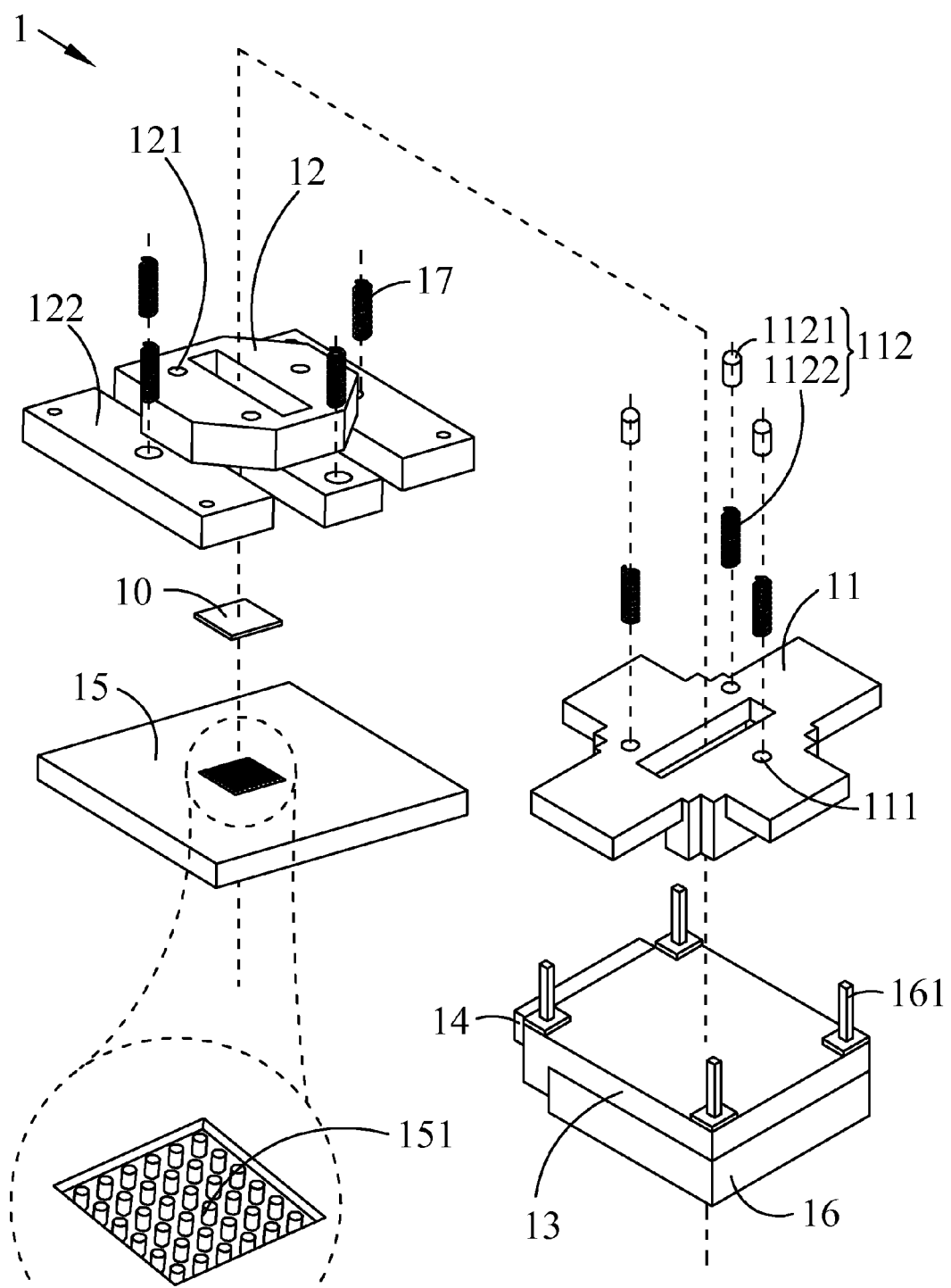
FIG. 5 is a third schematic view of an adjustment device in accordance with the first embodiment of the present invention.

With reference to FIGS. 3 to 5 for the first, second and third schematic views of an adjustment device in accordance with the first preferred embodiment of the present invention respectively, the adjustment device 1 comprises: a first platform 11, a second platform 12, a third platform 13, a control module 14, a cover 15, an adjusting portion 16 and four restoring elastic elements 17. The first platform 11 has three cavities 111, and each cavity 111 contains a positioning module 112 therein, and each positioning module 112 is comprised of a curved surface body 1121 and a positioning elastic element 1122. Wherein, the positioning module 112 is combined with a ball bearing of a spring in a practical application. The second platform 12 is arranged on a side of the first platform 11 and has a recess 121 corresponding to each curved surface body 1121. Four restoring springs 17 are installed between the first platform 11 and the second platform 12. Each curved surface body 1121 is a spherical surface or a cambered surface designed according to actual requirements. The photosensitive element 10 is disposed on a disposition plane 123 of the second platform 12, and the second platform 12 has a plurality of adhesion units 124 installed corresponding to the disposition plane 123, and the photosensitive element 10 is attached onto the disposition plane 123 by the way of adhesion. Wherein, the disposition plane 123 is parallel to a loading support surface 1221 of the loading support portion 122. The photosensitive element 10 can be a charge coupled device (CCD) or a complementary metal oxide semiconductor (CMOS). In addition, a loading support portion 122 is extended outwardly from the second platform 12. The third platform 13 is arranged on the other side of the first platform 11 and electrically coupled to the control module 14. The cover 15 includes a plurality of pins 151 conforming to the external appearance of the photosensitive element 10 for pressing the photosensitive element 10 uniformly to attach the photosensitive element 10 onto the disposition plane 123 of the second platform 12 closely. Wherein, the gap between adjacent pins 151 falls within a range between 3 cm and length or width value of the photosensitive element 10. The adjusting portion 16 has four working claws 161, and each working claw 161 presses against the loading support portion 122 of the second platform 12 to move the second platform 12 in an axial direction. Wherein, the adjusting portion 16 can use a thread structure or a gear module to drive and operate each working claw 161. In this embodiment, the thread structure is used as an aspect for illustrating the invention, but the invention is not limited to the use of the thread structure only.

When the photosensitive element 10 is disposed on the disposition plane 123 of the second platform 12, the photosensitive element 10 and the axis (indicated by the dotted line in the figure) may have an angle of inclination. Now, each working claw 161 of the adjusting portion 16 pushes the loading support portion 122 of the second platform 12, such that the second platform 12 can adjust the angle of inclination of the photosensitive element 10 and the axis. Since the disposition plane 123 is parallel to the loading support surface 1221, therefore the loading support surface 1221 can be pushed to adjust the angle of inclination of the photosensitive element 10 and the axis. During the process of adjusting the inclination angle, the positioning module 112 drives the second platform 12 to have an axial displacement without any axial rotation.

More specifically, when the photosensitive element 10 is disposed on the disposition plane 123 of the second platform 12, there may be an angle of inclination with respect to the axis. To install the photosensitive element 10 in the camera device precisely, it is necessary to set the light sensing surface of the photosensitive element 10 to be perpendicular to the axis. Since the loading support surface 1221 of the loading support portion 122 of the second platform 12 is parallel to the disposition plane 123, therefore the loading support portion 122 can be pushed to achieve the effect of adjusting the photosensitive element 10. When the loading support portion 122 is pushed, the second platform 12 may have an axial displacement, rotation, or both displacement and rotation. To avoid the rotation, the curved surface body 1121 of the positioning module 112 and the recess 121 of the second platform 12 are interacted, so that the second platform 12 only has the axial displacement without any rotation. When the second platform 12 performs the axial displacement, the first platform 11 can be moved together with the second platform 12 simultaneously by the plurality of restoring springs 17, and the first platform 11 and the second platform 12 are maintained with a predetermined distance apart, so as to prevent the positioning module 112 from being damaged due to a too-large distance between the two platforms. In addition, the control module 14 controls the third platform 13 to adjust the photosensitive element 10 to a predetermined focal plane of the adjustment device 1.

Figure 6:
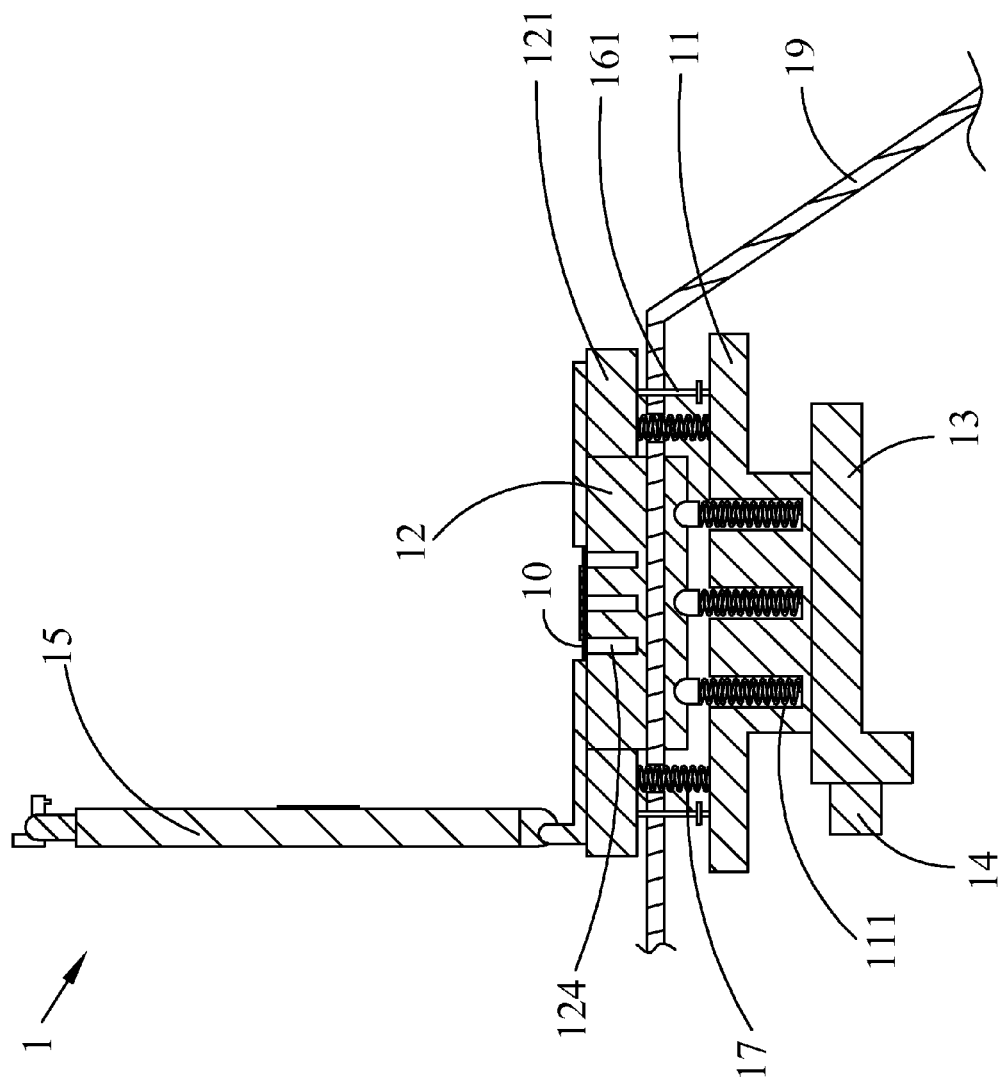
FIG. 6 is a first schematic view of an adjustment device in accordance with a second embodiment of the present invention.
Figure 7:
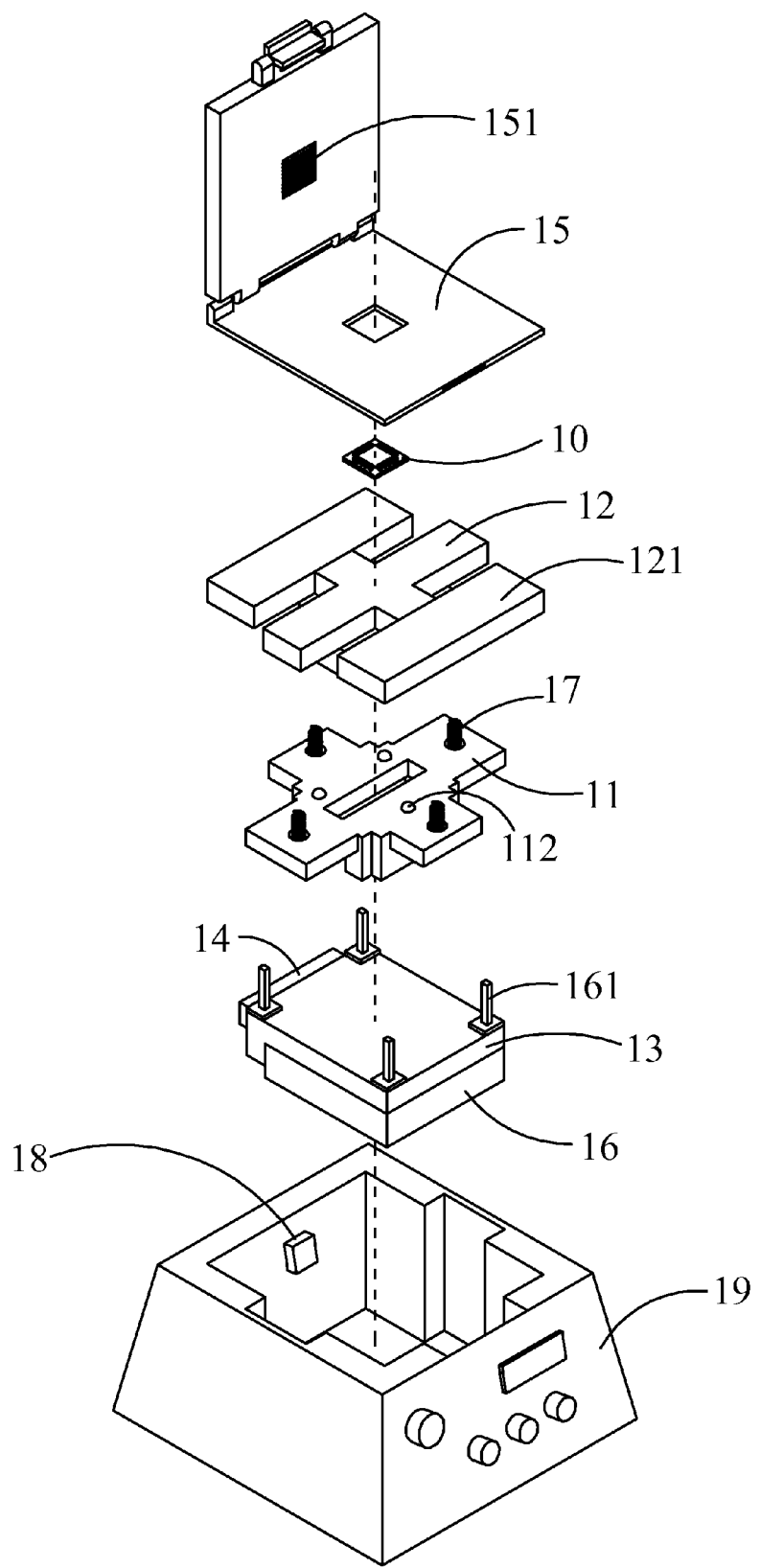
FIG. 7 is a second schematic view of an adjustment device in accordance with the second embodiment of the present invention.

With reference to FIGS. 6 and 7 for the first and second schematic views of an adjustment device in accordance with the second preferred embodiment of the present invention respectively, the adjustment device 1 comprises a first platform 11, a second platform 12, a third platform 13, a control module 14, a cover 15, an adjusting portion 16, plurality of restoring elastic elements 17, a sensing module 18 and a casing 19. The first platform 11 has three cavities 111, and each cavity 111 has a positioning module 112, and each positioning module 112 includes a curved surface body 1121 and a positioning elastic element 1122. The second platform 12 is arranged on a side of the first platform 11 and a recess 121 corresponding to each curved surface body 1121. Wherein, a plurality of restoring elastic elements 17 is installed between the first platform 11 and the second platform 12. A loading support portion 122 is extended outwardly from the second platform 12. The photosensitive element 10 is disposed on a disposition plane 123 of the second platform 12, and the second platform 12 includes a plurality of adhesion units 124 used for attaching the second platform 12 onto the disposition plane 123 closely. The third platform 13 is arranged on the other side of the first platform 11 and electrically coupled to the control module 14. The cover 15 with a plurality of pins 151 presses the photosensitive element 10 against the second platform 12. Wherein, the cover 15 is a flip cover, and the plurality of pins 151 is arranged conforming to an upper cover of the flip cover installed at the photosensitive element 10. The adjusting portion 16 has four working claws 161, and each working claw 161 pushes the loading support portion 122 to move the second platform 12 along an axis. The sensing module 18 senses a displacement of the second platform 12 to generate a displacement signal and transmit the displacement signal to the control module 14.

More specifically, a photosensitive element 10 is disposed on a disposition plane 123 of the second platform 12, and the photosensitive element 10 may have an angle of inclination with respect to an axis (which is the optical axis of the camera device). To install the photosensitive element 10 in the camera device more precisely, the light sensing surface of the photosensitive element 10 is adjusted to be perpendicular to the optical axis. Now, each working claw 161 of the adjusting portion 16 can be used to push the loading support portion 122 of the second platform 12 to set the light sensing surface perpendicular to the optical axis. During the pushing process, the expansion of the positioning elastic element 1122 of the positioning module 112, the curved surface body 1121 is maintained in contact with the recess 121 of the second platform 12, such that the first platform 11 and the second platform 12 are only moved in an axial direction without any rotation during the adjustment process. It is noteworthy that the second platform 12 is attached onto a side of the first platform 11 flatly when the adjustment device 1 is situated at an initial state (when the second platform 12 has not been pushed). In other words, there is no gap between the first platform 11 and the second platform 12 when the adjustment device 1 is situated at the initial state. During the adjustment process, the second platform 12 is pushed away from the first platform 11 gradually. Now, the four restoring springs 17 can be used to move the first platform 11 together with the second platform 12 to prevent damages to the positioning module 112 during the adjustment process due to the too-large gap between the first platform 11 and the second platform 12. In the adjustment process, the sensing module 18 senses a displacement of the second platform 12 to generate a displacement signal at any moment and transmits the displacement signal to the control module 14. In practical applications, a light sensing type distance measuring module can be used to measure the distance between the second platform 12 and a fixed top cover in order to measure and calculate the actual displacement of the second platform 12. After the photosensitive element 10 is adjusted, the control module 14 can be used to return the third platform 13 to its original position according to the displacement signal, or prevent the first platform 11 and the second platform 12 from moving too far in an axial direction during the adjustment process, which may cause the problem of unable to make the adjustment. Therefore, the control module 14 receives and determines the displacement signal. When the displacement reaches a critical value, the control module 14 controls the third platform 13 to move in an opposite direction to drive the first platform 11 and the second platform 12 to move in the opposite direction along the axial displacement simultaneously.

Figure 8:
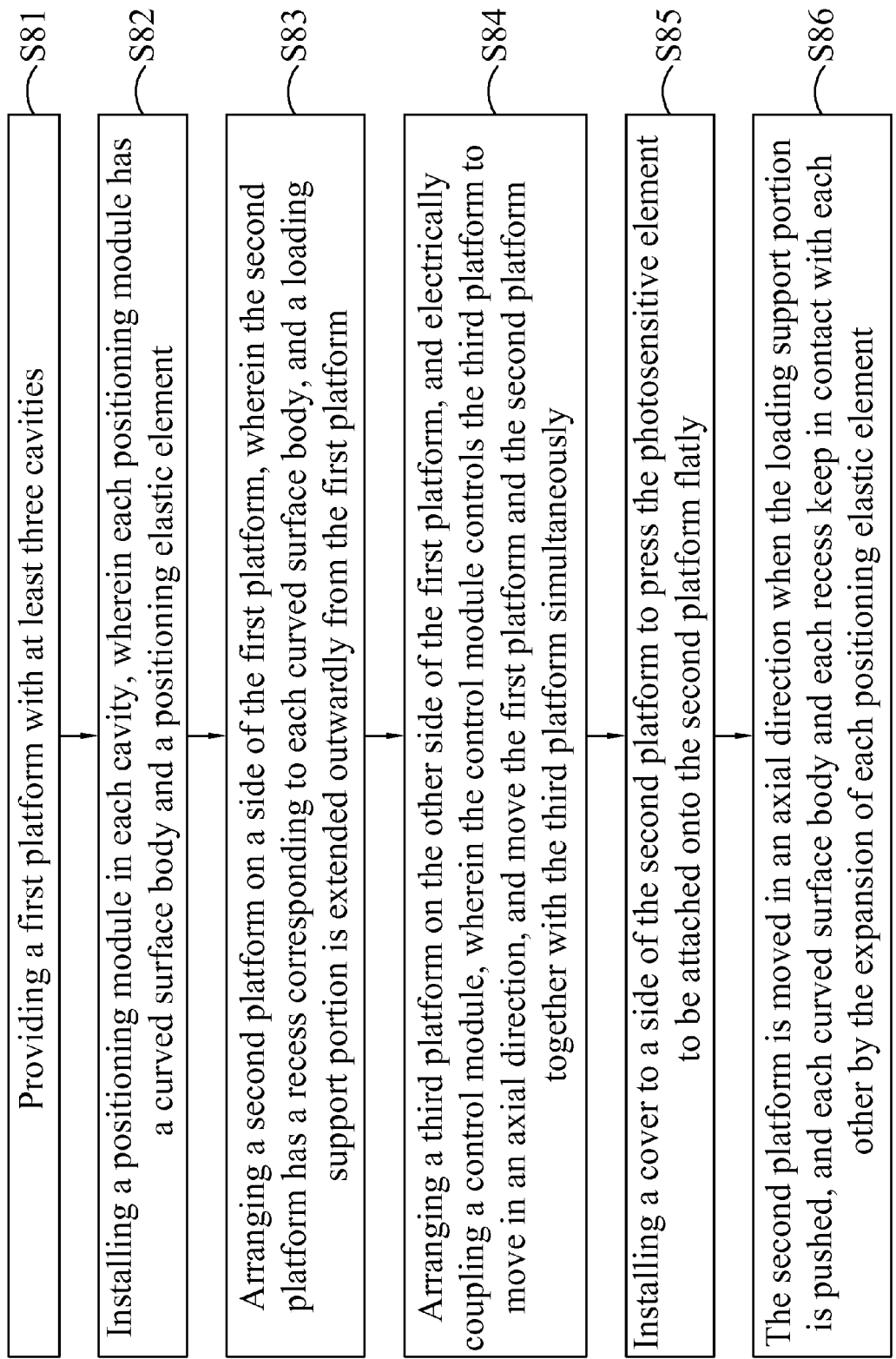
FIG. 8 is a flow chart of an adjustment method of the present invention.

With reference to FIG. 8 for a flow chart of an adjustment method in accordance with the present invention, the adjustment method is applied in an adjustment device for adjusting a photosensitive element, and the adjustment method comprises the following steps:

S81: Providing a first platform with at least three cavities.

S82: Installing a positioning module in each cavity, wherein each positioning module has a curved surface body and a positioning elastic element.

S83: Arranging a second platform on a side of the first platform, wherein the second platform has a recess corresponding to each curved surface body, and a loading support portion is extended outwardly from the first platform.

S84: Arranging a third platform on the other side of the first platform, and electrically couple a control module, wherein the control module controls the third platform to move in an axial direction, and move the first platform and the second platform together with the third platform simultaneously.

S85: Installing a cover to a side of the second platform to press the photosensitive element to be attached onto the second platform closely.

S86: The second platform is moved in an axial direction when the loading support portion is pushed, and each curved surface body and each recess keep in contact with each other by the expansion of each positioning elastic element.

The details of the adjustment method of this embodiment are similar to those described in the section of the adjustment device of the present invention, and thus will not be repeated.

While the invention has been described by means of specific embodiments, numerous modifications and variations could be made thereto by those skilled in the art without departing from the scope and spirit of the invention set forth in the claims.

What is claimed is:

1. An adjustment device, applied for adjusting a photosensitive element, comprising:
a first platform, having at least three cavities, each of the cavities having a positioning module, and each of the positioning modules having a curved surface body and a positioning elastic element;
a second platform, arranged on a side of the first platform, and having a recess corresponding to each of the curved surface bodies, and a loading support portion extended outwardly from the second platform;
a third platform, arranged on the other side of the first platform, and electrically coupled to a control module, and the control module controlling the third platform to move in an axial direction, and making the first platform and the second platform move together with the third platform simultaneously; and
a cover, disposed on a side of the second platform, for pressing the photosensitive element to attach onto the second platform closely;
wherein, when the loading support portion of the second platform is push by an external force, the second platform moves in the axial direction to adjust an inclination angle of the photosensitive element, and each of the positioning elastic elements is stretched to keep each of the curved surface bodies in contact with each of the recesses.

2. The adjustment device of claim 1, further comprising an adjusting portion having at least three working claws for pushing the loading support portion respectively to move the second platform in the axial direction.

3. The adjustment device of claim 1, further comprising a plurality of restoring elastic elements disposed between the first platform and the second platform, such that when the second platform moves in the axial direction, the restoring elastic elements drive the first platform to move together with the second platform in the axial direction.

4. The adjustment device of claim 1, wherein the second platform further includes a plurality of adhesion units for attaching the photosensitive element onto the second platform closely.

5. The adjustment device of claim 1, wherein the cover includes a plurality of pins conforming to a shape of the photosensitive element for uniformly pressing the photosensitive element, so that the photosensitive element attaches onto the second platform closely.

6. The adjustment device of claim 5, wherein a gap between adjacent pins falls within a range between three centimeters and a length or width value of the photosensitive element.

7. The adjustment device of claim 1, wherein the photosensitive element is disposed on a disposition surface of the second platform and the disposition surface is parallel to a load support surface of the loading support portion.

8. The adjustment device of claim 1, further comprising a sensing module for sensing a displacement of the second platform in the axial direction to generate a displacement signal, and the control module according to the displacement signal controls the third platform to move in an opposite direction along the axial direction in order to move the first platform and the second platform in the opposite direction along the axial direction.

9. The adjustment device of claim 1, wherein the second platform is attached onto the side of the first platform closely when the adjustment device is situated in an initial adjustment state.

10. The adjustment device of claim 1, wherein each of the positioning modules prevents the second platform from having a rotation in the axial direction when the adjustment device adjusts the inclination angle of the photosensitive element.

11. An adjustment method for a photosensitive element, comprising:
providing a first platform having at least three cavities;
installing a positioning module in each of the cavities, wherein each of the positioning modules has a curved surface body and a positioning elastic element;
arranging a second platform on a side of the first platform, wherein the second platform has a recess corresponding to each of the curved surface bodies, and a loading support portion is extended outwardly from the first platform;
arranging a third platform on the other side of the first platform, and electrically coupling a control module, wherein the control module controls the third platform to move in an axial direction, so that the first platform and the second platform move together with the third platform simultaneously;
disposing a cover on a side of the second platform to press the photosensitive element to be attached onto the second platform closely; and
pushing the loading support portion by an external force to move the second platform in the axial direction, wherein an expansion of each of the positioning elastic elements keeps each of the curved surface bodies in contact with each of the recesses.

12. The adjustment method of claim 11, further comprising the step of using an adjusting portion having at least three working claws to push the loading support portion respectively to move the second platform in the axial direction.

13. The adjustment method of claim 11, further comprising the steps of:
disposing a plurality of restoring elastic elements between the first platform and the second platform;
moving the first platform together with the second platform in the axial direction by the expansion of the restoring elastic elements.

14. The adjustment method of claim 11, further comprising the step of: disposing a plurality of adhesion units onto the second platform to attach the photosensitive element onto the second platform closely.

15. The adjustment method of claim 11, wherein the cover includes a plurality of pins conforming to a shape of the photosensitive element for uniformly pressing the photosensitive element, so that the photosensitive element attaches onto the second platform closely.

16. The adjustment method of claim 15, wherein a gap between adjacent pins falls within a range between three centimeters and a length or width value of the photosensitive element.

17. The adjustment method of claim 11, wherein the photosensitive element is disposed on a disposition surface of the second platform and the disposition surface is parallel to a load support surface of the loading support portion.

18. The adjustment method of claim 11, further comprising the steps of:
providing a sensing module to sense a displacement of the second platform in the axial displacement to generate a displacement signal; and
using the control module according to the displacement signal to control the third platform to move in an opposite direction along the axial direction in order to move the first platform and the second platform in the opposite direction along the axial direction.

19. The adjustment method of claim 11, wherein the second platform is attached onto the side of the first platform closely in an initial adjustment state.

20. The adjustment method of claim 11, wherein each of the positioning modules prevents the second platform from having a rotation in the axial direction when the adjustment device adjusts an inclination angle of the photosensitive element.

* * * * *